United States Patent [19]

Compton et al.

[11] 4,105,746

[45] Aug. 8, 1978

[54] METHOD AND APPARATUS FOR PROVIDING NEGATIVE IONS OF ACTINIDE-METAL HEXAFLUORIDES

[75] Inventors: Robert N. Compton, Oak Ridge; Paul W. Reinhardt, Kingston; William R. Garrett, Oak Ridge, all of Tenn.

[73] Assignee: The United States of America as represented by the United States Department of Energy, Washington, D.C.

[21] Appl. No.: 766,278

[22] Filed: Feb. 7, 1977

[51] Int. Cl.$^2$ .................. C01G 43/06; C01G 56/00
[52] U.S. Cl. .................................. 423/251; 423/19; 423/250; 423/258; 250/424; 250/531; 204/164
[58] Field of Search ............... 423/19, 258; 204/1.5, 204/164; 250/424, 531

[56] References Cited

U.S. PATENT DOCUMENTS

| | | | |
|---|---|---|---|
| 3,577,026 | 5/1971 | Haeberli | 250/424 |
| 4,024,217 | 5/1977 | Wexler et al. | 250/424 |

OTHER PUBLICATIONS

Beauchamp, J. Chem. Phys., 64, No. 3, pp. 929–934, (1976).
Compton, J. Chem. Phys., 66, No. 10, pp. 4478–4485 (1977).
Goode et al., Negative Ions and the Magnetron, pp. 5–13, Wiley-Interscience (1969), New York.
Katy et al., "The Chemistry of Uranium," Division VIII, vol. 5, pp. 396–397, 445–446, McGraw-Hill Book Co., (1951), New York.

Primary Examiner—Edward A. Miller
Attorney, Agent, or Firm—Dean E. Carlson; Stephen D. Hamel; Stephen D. Hamel

[57] ABSTRACT

This invention relates to a novel method and a novel generator, or source, for providing gaseous negative ions of selected metal hexafluorides. The method is summarized as follows: in an evacuated zone, reacting gaseous fluorine with an actinide-metal body selected from the group consisting of uranium, plutonium, neptunium, and americium to convert at least part of the metal to the hexafluoride state, thus producing gaseous negatively charged metal-hexafluoride ions in the evacuated zone, and applying an electric field to the zone to remove the ions therefrom. The ion source comprises a chamber defining a reaction zone; means for evacuating the zone; an actinide-metal body in the zone, the metal being uranium, plutonium, neptunium, or americium; means for contacting the body with gaseous fluorine to convert at least a part thereof to the hexafluoride state; and means for applying an electric field to the evacuated zone to extract gaseous, negatively charged metal-hexafluoride ions therefrom. The invention provides unique advantages over conventional surface-ionization techniques for producing such ions.

11 Claims, 3 Drawing Figures

METHOD AND APPARATUS FOR PROVIDING NEGATIVE IONS OF ACTINIDE-METAL HEXAFLUORIDES

BACKGROUND OF THE INVENTION

This invention was made in the course of, or under, a contract with the Energy Research and Development Administration.

The invention relates generally to the production of gaseous negative ions and more particularly to a new method and ion source for producing gaseous negative ions of the hexafluorides of selected actinide metals.

Negative surface-ionization is a well-known technique for the production of gaseous negative ions. As exemplified by the production of negative ions of uranium hexafluoride—i.e., $UF_6^-$ ions—the technique typically comprises impinging gaseous $UF_6$ on a heated metal surface, such as rhenium or platinum. The impinging vapor reevaporates from the surface in the singly ionized form. The production of $UF_6^-$ in this manner has proven useful, particularly as a means of generating $UF_6^-$ in the ionization chamber of an ion cyclotron resonance mass spectrometer or the like.

Although the conventional negative surface-ionization technique referred to above has proven useful for the generation of $UF_6^-$ and analogous ions, the technique is subject to several shortcomings. First, the yield of negative ions per unit area of the ionization surface is not as large as desired. Also, an undesirably high temperature often is required. Again, the technique typically entails the rather cumbersome procedure of first producing gaseous $UF_6$ externally of an ionization chamber, and then conveying the $UF_6$ to the chamber for conversion therein to the ionized form. Finally, in conventional negative surface-ionization processes the metal surface effecting ionization tends to become contaminated with use and thus less efficient. There is also evidence that in the case of platinum, contamination of the surface with hydrocarbons is necessary to optimize surface ionization.

It has long been known that various metal hexafluorides can be prepared by reacting selected metals with gaseous fluorine, usually at an elevated temperature. For example, gaseous $UF_6$ often has been prepared at elevated temperatures by reacting gaseous fluorine and elemental uranium in the form of a powder, a massive article, or a filament.

OBJECTS OF THE INVENTION

It is an object of this invention to provide a novel ion source for supplying gaseous negative ions.

It is another object to provide a novel method for generating and collecting gaseous negative ions of a selective actinide-metal hexafluoride.

It is another object to provide a method for providing gaseous negative ions of selected metal hexafluorides by a modified form of negative surface-ionization, the new method being characterized by a relatively high yield of negative ions per unit surface area of the surface effecting ionization.

It is another object to provide gaseous negative ions of the hexafluoride of a selected actinide metal by reacting the metal with gaseous fluorine in an evacuated zone to form said ions in said zone and removing the ions from the zone.

It is another object to provide a method and an apparatus for producing a beam of gaseous, negatively charged, metal-hexafluoride ions.

SUMMARY OF THE INVENTION

One form of this invention is summarized as follows: A source for supplying gaseous negative ions comprising a chamber defining a reaction zone; means for evacuating said zone; an actinide-metal body in said zone, said metal being selected from the group consisting of uranium, plutonium, neptunium, and americium; means for contacting said body with gaseous fluorine to convert at least a portion of said body to the corresponding metal hexafluoride; and means for applying an electric field to said zone to extract therefrom negative ions of said metal hexafluoride. Another form of the invention is summarized as follows: A method for providing gaseous, negatively charged metal-hexafluoride ions comprising: in an evacuated zone reacting gaseous fluorine with an actinide-metal body, said metal being selected from the group consisting of uranium, plutonium, neptunium, and americium, to convert at least part of said body to the hexafluoride state; and applying an electric field to the evacuated zone to extract therefrom gaseous, negatively charged ions of the resulting metal hexafluoride.

DESCRIPTION OF THE PREFERRED EMBODIMENT

This invention is applicable to the production of gaseous negative ions of selected actinide-metal hexafluorides, such as $UF_6$, $PuF_6$, $NpF_6$, and $AmF_6$. For brevity, the invention will be illustrated herein chiefly in terms of the production of singly charged negative ions of uranium hexafluoride—i.e., $UF_6^-$.

Referring to our invention as applied to the production of negative ions of uranium hexafluoride, we have found that gaseous $UF_6^-$ is produced by reacting gaseous fluorine and a uranium body in an evacuated zone. That is, we have discovered a new and useful source of negative ions. Preferably, the reaction producing the $UF_6^-$ is conducted at an elevated temperature, but it can also be carried out without the addition of heat. If desired, the reaction may be conducted under self-sustaining conditions. Preferably, the gaseous fluorine contacts the uranium as a stream; however, the reaction can be conducted under static conditions. The uranium to be reacted preferably is in the elemental state, although it may be that it could be in the form of an alloy. As applied to the metal of interest—e.g., uranium—the term "body" is used herein to refer to any non-gaseous form thereof, such as pellets, powder, a filament, a molten pool, a layer on any suitable substrate, or a uranium particle or fragment incorporated in another material. The reaction is conducted in an evacuated, or subatmospheric, zone to minimize neutralization of the product ions by other gaseous molecules. Preferably, the pressure in the evacuated zone is below $10^{-2}$ torr. Under some reaction conditions, thermionic emission from the metal may occur but this does not adversely affect the formation of negative ions.

In one embodiment of the invention as exemplified the production and utilization of $UF_6^-$, a uranium filament is mounted in an evacuated chamber serving as the ionization chamber for a conventional mass spectrometer—say, a conventional Dempster mass spectrometer. A current is passed through the filament to heat the same to a selected temperature, and gaseous fluorine is impinged on the heated filament to convert part of the same to the hexafluoride state, thus generating gaseous $UF_6^-$ in the zone about the filament. An electric field established in conventional fashion is applied to the reaction zone to extract the $UF_6^-$ ions into the mass spectrometer, which separates them into beams according to mass and directs the beams onto separate, positively charged collector plates, thus generating plate currents which are proportional to the number of $UF_6^-$ ions incident thereon. This particular form of our method—i.e., generating $UF_6^-$ ions in the manner described and electrically collecting the same in a mass spectrometer—provides significant advantages, as will be described.

EXAMPLE

Figure 1:
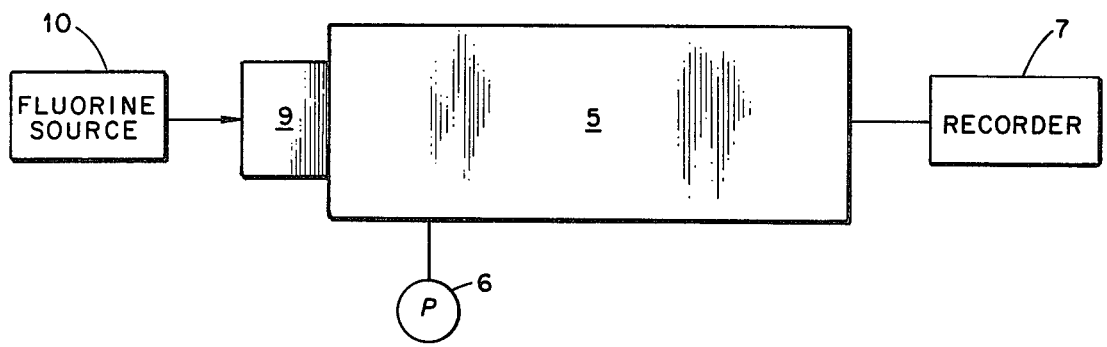
FIG. 1 is a block diagram of a system including a negative-ion source designed in accordance with this invention and a conventional time-of-flight mass spectrometer for generating currents proportional to the number of negative ions electrically withdrawn from the source.

FIG. 1 is a schematic diagram of a system in which negative ions were generated in accordance with this invention and detected by means of a mass spectrometer. The mass spectrometer, designated as 5, was of the conventional time-of-flight type, being similar to a Model No. 14206 time-of-flight spectrometer manufactured by the Bendix Corporation. The spectrometer was provided with the usual auxiliaries, such as vacuum pumps 6 and electrical power supplies, and included standard electrical circuitry 7 for registering the total ion current. The ionization chamber 9 of the spectrometer was connected to an external source 10 of gaseous fluorine. The chamber contained an ion source for generating $UF_6^-$ in accordance with this invention.

Figure 2:
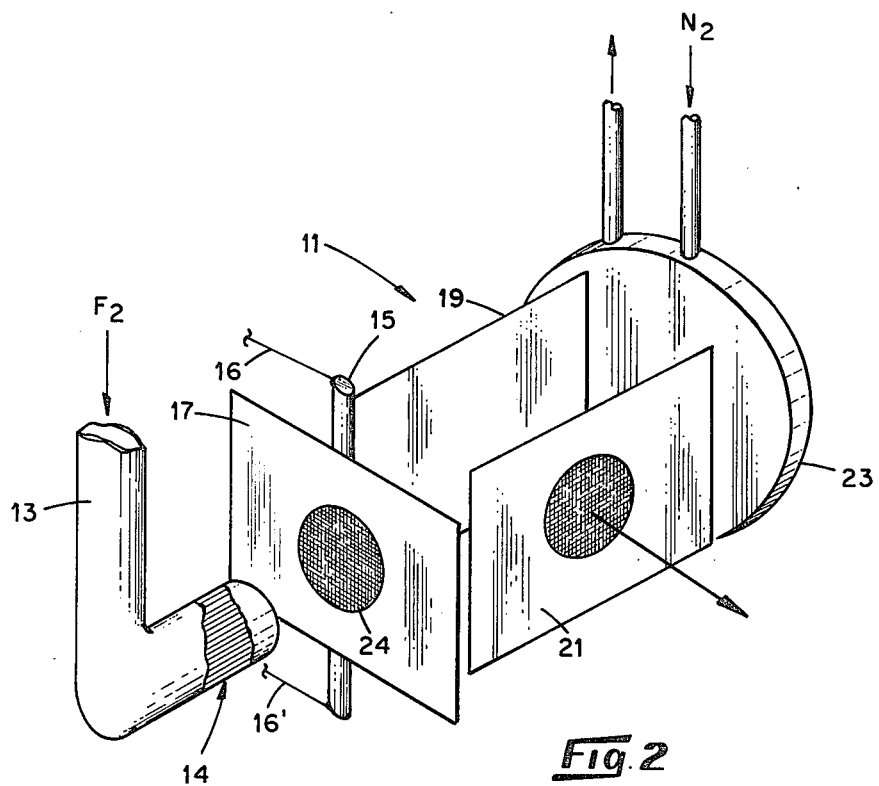
FIG. 2 is a schematic diagram of the negative-ion source shown in FIG. 1

Referring to FIG. 2, the ion source 11 included the following: an inlet tube 13 for introducing fluorine derived from the source 10; a uranium filament 15, connected by leads 16 and 16' across a standard adjustable electric power supply (not shown), the filament being mounted in line with the exit end of the inlet tube 13; a plate 17 mounted between the inlet tube and filament, and having an aperture 24 for permitting fluorine flow to the filament; a plate 19 for repelling negative ions toward the flight tube of the spectrometer; a plate 21 disposed opposite the repeller plate and having an aperture for collimating negative ions directed into the flight tube; and a cold-trap 23 for condensing out unreacted fluorine, the trap being a disc through which liquid nitrogen was circulated.

Still referring to FIG. 2, the uranium filament 15 was designed with a diameter of 30 mils and a length of one inch. The fluorine-inlet aperture in plate 17 had a diameter of ½ inch. As mentioned, the filament 15 was connected to external means for resistively heating the filament to selected operating temperatures. The plates 17, 19, and 21 were composed of stainless steel, and the cold trap 23, of copper. As indicated, the apertures in plates 17 and 21 were provided with nickel screen, although this is not essential. The outlet end of the fluorine-inlet tube 13 contained a bundle of capillaries 14 for promoting uniform flow of the fluorine impinged on the filament. Standard adjustable power supplies were provided to apply operating voltages to the plates 17, 19, and 21. Typical operating voltages for these plates were as follows: plate 17, −5 volts; 19, −150 volt pulse; and 21, ground potential.

Figure 3:
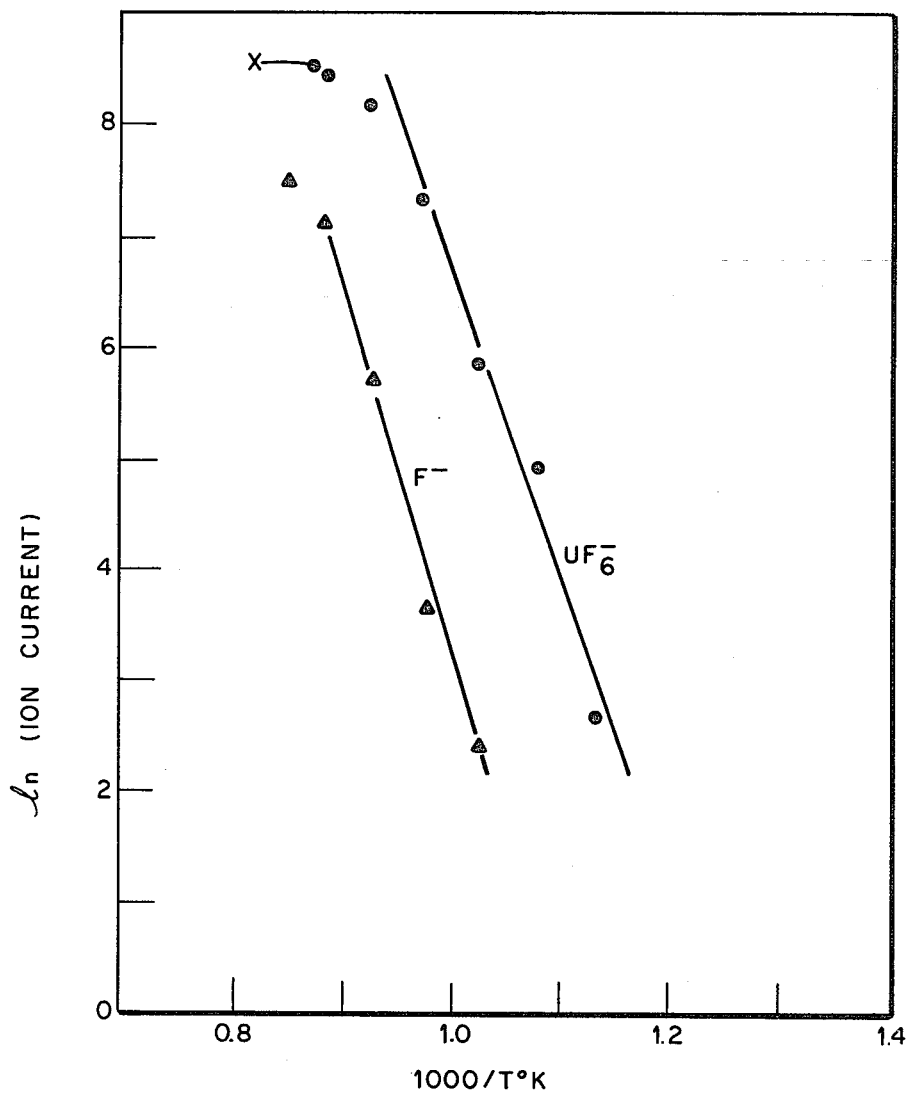
FIG. 3 is a graph presenting data obtained with the system illustrated in FIGS. 1 and 2. The graph correlates ion yield with the operating temperature of an ion-source filament designated as 15 in FIG. 2. The operating temperature is expressed as $1000/T°$ K, and the maximum ion yield (one microamp) is designated at "X".

Numerous runs were conducted with the system shown in FIGS. 1 and 2, under various conditions of operation. FIG. 3 summarizes the results obtained in a series of runs conducted as follows: With the ionization chamber and flight tube of the mass spectrometer evacuated to approximately $1 \times 10^{-7}$ torr, and with the uranium filament 15 at a selected temperature in the range of 910° K to 1040° K, gaseous fluorine was admitted to the ionization chamber 9 at a selected constant rate, the concentration of the fluorine being above the stoichiometric requirement for converting the uranium to the hexafluoride. In these runs the fluorine background pressure as measured in the flight tube was approximately $4 \times 10^{-7}$, with the exception that in one run the fluorine background pressure was increased to about $1 \times 10^{-6}$ torr. In the latter run, a microammeter was used to measure $UF_6^-$ signal. At the end of the typical run, the surface of the uranium filament was clean and lustrous—i.e., free from surface contamination. As shown in FIG. 3, some F$^-$ ions also were detected. As indicated at "X", the highest $UF_6^-$ ion current was obtained at a filament temperature of approximately 1130° K. As previously mentioned, the fluorine pressure for this run was $\sim 1 \times 10^{-6}$ torr. It will be understood that the operating conditions for these runs were not optimized and that even higher yields of $UF_6^-$ may be obtainable in accordance with this invention.

In the above-mentioned run conducted at a fluorine background pressure of $\sim 1 \times 10^{-6}$ torr, a maximum $UF_6^-$ signal of one microamp was obtained. As compared with ion currents generated by conventional negative surface-ionization sources of comparable surface area, this signal is large. Thus, this invention may prove especially useful where relatively large amounts of $UF_6^-$ (or $PuF_6^-$, $NpF_6^-$, or $AmF_6^-$) are desired. For instance, the invention may prove especially useful in analytical mass spectrometry and in some heavy-ion accelerators, such as tandem Van de Graaff accelerators. It may also be useful for selectively removing uranium, plutonium, etc., from materials which do not form gaseous negative ions when exposed to gaseous fluorine as described.

As will be discussed in more detail, very few metals form negative ions when converted to the hexafluoride in accordance with this invention. This characteristic of the invention may be used to advantage in analytical applications, as, for example, where a rapid but highly accurate determination of the $U^{235}$ content of uranium chips or filings is desired. In accordance with the invention, the chips can be placed in a boat in the ionization chamber of a Dempster mass spectrometer and then reacted, preferably at an elevated temperature, with at least the stoichiometric amount of gaseous fluorine required to convert the uranium to the hexafluoride, thus generating gaseous $UF_6^-$; the $UF_6^-$ then can be extracted electrically, as described. Various impurities typically present in the uranium chips may simultaneously be converted to fluorides, but, as will be explained, these fluorides are not in the form of negative ions. The spectrometer resolves the resulting $UF_6^-$ beam into its constituent ionic masses—e.g., $U^{235}F_6^-$ and $U^{238}F_6^-$—and focuses them on separate collector plates. The weight percent of uranium-235 in the chips can be calculated readily from the current flow to the collector for the $U^{235}F_6^-$. Thus, when used in conjunction with our method of providing negative ions, the mass spectrometric analysis is not affected by impurities typically found in the sample—such impurities, for instance, as aluminum, iron, copper, manganese, and silicon. Similarly, our method reduces or eliminates troublesome "memory" effects due to the presence of various impurities left in the ionization chamber from previous runs.

We do not wish to be bound by a particular theory regarding the mechanism by which negative ions are generated in an ion source of the kind described herein. We have not established whether neutral gaseous metal-hexafluoride molecules are generated in addition to the negative ions. However, referring to the generation of $UF_6^-$ as an example, we believe that the invention involves the formation of $UF_6$ on the surface of the uranium, followed by negative surface ionization yielding gaseous $UF_6^-$. Presumably, ionization occurs because of the large difference between the electron affinity of $UF_6$ (5–6 eV) and the work function of uranium ($\sim 3.5$ eV). [As used herein the term "electron affinity" refers to the energy released when an electron is attached to an atom or molecule—for example, $UF_6$. The term "work function" is used to refer to the energy required to release an electron from a metal—for example, uranium.] The hexafluorides of plutonium, neptunium, and americium also can be expected to have unusually high electron affinities relative to the work functions of their respective metals. Thus, negative ions of hexafluorides of these other metals of interest also may be generated by a method analogous to that described above for the generation of $UF_6^-$. For instance, as applied to providing gaseous $PuF_6^-$, the method is conducted in an evacuated zone where a body of plutonium is contacted with gaseous fluorine at a temperature and concentration high enough to convert at least part of the plutonium to the hexafluoride state, the resulting gaseous $PuF_6^-$ being extracted from the zone by applying an electric field to the zone. $NpF_6^-$ and $AmF_6^-$ may be provided in an analogous manner. On the basis of the experiments we have conducted thus far, it is believed that our method is effective for any metal hexafluoride whose electron affinity exceeds the work function of the metal by $\sim 2$ eV.

What is claimed is:

1. A method for providing gaseous, negatively charged metal-hexafluoride ions comprising:
   in an evacuated zone reacting gaseous fluorine with an actinide-metal body, said metal being selected from the group consisting of uranium, plutonium, neptunium, and americium, to convert at least part of said body to gaseous negative ions of the corresponding metal hexafluoride; and
   applying an electric field to the evacuated zone to extract said ions therefrom.

2. The method of claim 1 wherein said metal body and said fluorine are reacted in an evacuated zone which is at a pressure below $10^{-2}$ torr.

3. The method of claim 2 wherein said metal body is a filament.

4. The method of claim 3 wherein said filament is heated to a selected operating temperature by passage of an electric current therethrough.

5. The method of claim 2 wherein said metal body is in the molten state.

6. A method for supplying negatively charged gaseous metal-hexafluoride ions comprising:
   reacting gaseous fluorine and a hexavalent actinide-metal body in an evacuated zone to form said ions, said metal being one whose hexafluoride has an electron affinity which exceeds the work function of said metal by at least approximately two electron-volts, and
   electrically extracting said ions from said zone.

7. Apparatus for supplying gaseous negative ions comprising
   a chamber defining a reaction zone for accommodating an actinide-metal body selected from the group consisting of uranium, plutonium, neptunium, and americium;
   means for evacuating said chamber;
   means for introducing fluorine into said chamber while evacuated to contact said body and convert at least a portion of said body to molecules of the corresponding metal hexafluoride which vaporize from said body in the form of gaseous negative ions of said metal hexafluoride; and
   means for applying an electric field to said zone to extract said ions therefrom.

8. The apparatus defined in claim 7 also including means for heating said body.

9. The apparatus defined in claim 7 also including means for collimating the extracted gaseous negative ions.

10. The apparatus defined in claim 7 where said body is a filament.

11. The apparatus defined in claim 7 where said body is molten.

* * * * *